United States Patent [19]
Lengyel et al.

[11] Patent Number: 5,466,886
[45] Date of Patent: Nov. 14, 1995

[54] ELECTRICAL OUTLET BOX ASSEMBLY FOR POWER AND COMMUNICATION WIRES

[75] Inventors: Szabolcs G. Lengyel, Monroe; Thomas C. Murphy, Jr., Milford, both of Conn.

[73] Assignee: Hubbell Incorporated, Orange, Calif.

[21] Appl. No.: 76,692

[22] Filed: Jun. 15, 1993

Related U.S. Application Data

[63] Continuation of Ser. No. 522,823, May 14, 1990, abandoned.

[51] Int. Cl.⁶ .................................................. H02G 3/12
[52] U.S. Cl. .................................................. 174/48; 174/57
[58] Field of Search .................................. 174/48, 49, 53, 174/57; 220/3.7; 52/220.1

[56] References Cited

U.S. PATENT DOCUMENTS

| | | | |
|---|---|---|---|
| 2,811,574 | 10/1957 | Guerrero | 174/57 |
| 3,061,663 | 10/1962 | Reiland | 174/49 |
| 3,343,704 | 9/1967 | Terry | 220/3.4 |
| 3,472,945 | 10/1969 | Trachtenberg | 174/53 |
| 3,587,906 | 6/1971 | Pepe | 174/53 |
| 3,932,696 | 1/1976 | Fork et al. | 174/48 |
| 3,956,573 | 5/1976 | Myers et al. | 174/48 |
| 4,041,238 | 8/1977 | Penczak | 174/48 |
| 4,091,231 | 5/1978 | Sotolongo | 174/48 |
| 4,165,443 | 8/1979 | Figart et al. | 174/57 X |
| 4,331,832 | 5/1982 | Curtis et al. | 174/57 |
| 4,336,416 | 6/1982 | Goodsell | 174/48 |
| 4,408,090 | 10/1983 | Kohaut | 174/48 |
| 4,458,460 | 7/1984 | Kohaut | 174/48 |
| 4,477,694 | 10/1984 | Kohaut | 174/48 |
| 4,572,923 | 2/1986 | Castellani et al. | 174/48 |
| 4,661,652 | 4/1987 | Benscoter | 174/48 |
| 4,770,643 | 9/1988 | Castellani et al. | 439/135 |
| 4,783,577 | 11/1988 | Mohr | 174/48 |
| 4,827,080 | 5/1989 | Castellani et al. | 174/48 |
| 4,916,258 | 4/1990 | Mohr | 174/48 |
| 4,931,597 | 6/1990 | Kimbrough et al. | 174/48 |
| 5,121,594 | 6/1992 | Wuertz | 52/745.21 |
| 5,243,129 | 9/1993 | Bates et al. | 174/48 |

*Primary Examiner*—Kristine L. Kincaid
*Assistant Examiner*—David Tone
*Attorney, Agent, or Firm*—Jerry M. Presson; David L. Tarnoff

[57] ABSTRACT

An electrical outlet box assembly for separating and insulating high voltage power wires from low voltage communication wires. The electrical outlet box assembly includes a housing adapted to be embedded into a poured concrete floor, an electrical shielding assembly coupled within the housing, a leveling assembly for coupling and leveling an electrical receptacle to the housing, a floor plate or carpet flange, and a receptacle cover. The electrical shielding assembly includes a wiring enclosure releasably coupled to the housing by a snap fit having an interior passage for receiving and separating the high voltage power wires from the low voltage communication wires which pass over the exterior of the wiring enclosure, and a receptacle insulator member adapted to surround a receptacle mounted in the housing. The leveling assembly includes a receptacle mounting member having four coupling flanges with elongated slots, four retaining clips fixedly coupled in slots in the housing, and four leveling screws which are received in the elongated slots of the coupling flanges and threadedly coupled to the retaining clips for leveling and adjusting the height of the receptacle mounting member.

69 Claims, 5 Drawing Sheets

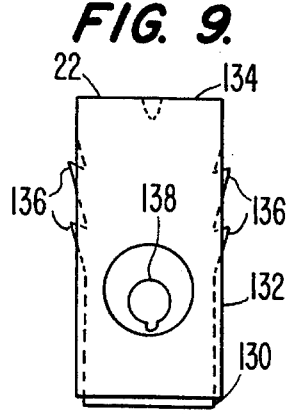
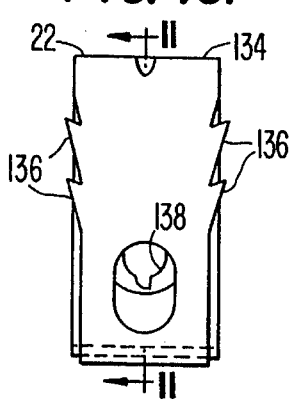
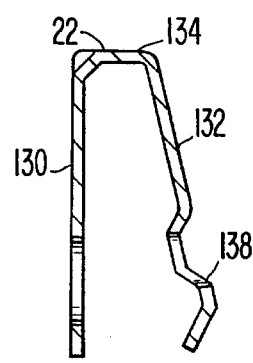
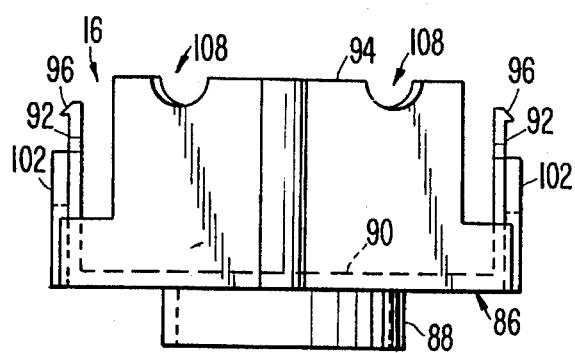
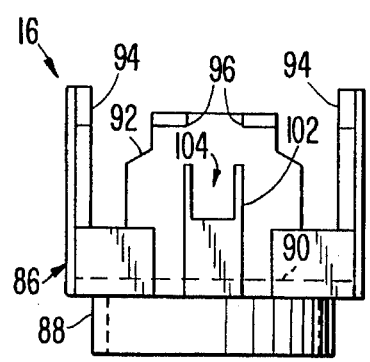
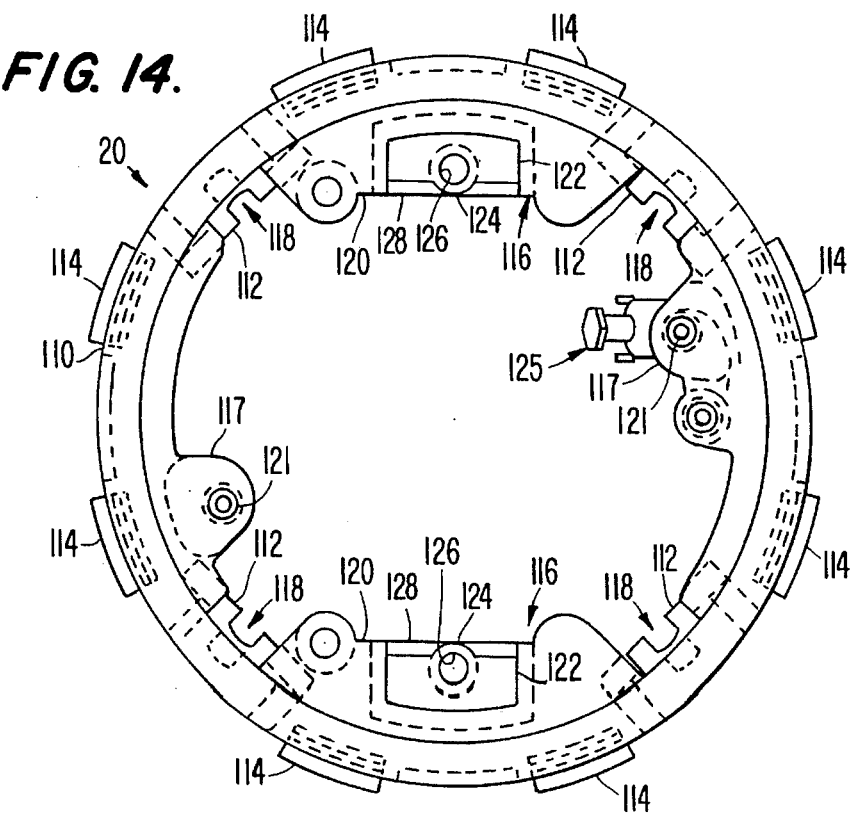

ELECTRICAL OUTLET BOX ASSEMBLY FOR POWER AND COMMUNICATION WIRES

This is a continuation of application Ser. No. 07/522,823 filed May 14, 1990, now abandoned.

FIELD OF THE INVENTION

This invention relates to an electrical outlet box assembly for power and communication wires. More specifically, the invention relates to an electrical outlet box assembly which includes a housing, an electrical shielding or insulating assembly coupled within the housing, a leveling assembly for coupling and leveling an electrical receptacle to the housing, a floor plate or carpet flange and a receptacle cover. The electrical shielding assembly includes a wiring enclosure for separating and insulating the power wires from the communication wires, and a receptacle insulator for insulating a receptacle mounted in the housing. The leveling assembly includes a receptacle mounting member for releasably coupling a receptacle within the housing, a plurality of retaining clips and a plurality leveling screws for releasably and adjustably coupling the receptacle mounting adaptor within the housing. The electrical outlet box assembly is especially useful as a floor box, which can be embedded in a poured concrete floor.

BACKGROUND OF THE INVENTION

Conventional electrical outlet boxes or floor boxes are difficult to install, since the adjustment of the height of these boxes is limited. Accordingly, this requires the installer to make adjustments in the support for the floor box to ensure that the floor box is flush with the floor surface. Moreover, these prior floor boxes are difficult to install flush with the surface of the poured concrete floor. These conventional floor boxes required the installer to use various time consuming processes for leveling the floor box. If the floor box is not leveled prior to pouring the concrete floor, then the top of the floor box would not be parallel or flush with the floor's surface.

An example of a prior floor box which attempts to overcome the above-mentioned problems is shown by U.S. Pat. No. 3,343,704 to Terry, which is incorporated herein by reference. The patent to Terry discloses a floor box that is adjustable in height by sawing an elongated cylindrical portion of the housing either flush with the floor or at a desired height above and parallel to the floor. The Terry floor box utilizes a special cover assembly having a cover holder with two downwardly depending flanges that are pivotally coupled to a mounting or leveling ring. The leveling ring is inserted into the cylindrical portion of the housing, and then cemented thereto for fixedly securing the leveling ring to the housing. The cover holder pivots about a single axis on the leveling ring to permit flush or parallel mounting of the cover holder with the floor's surface. Accordingly, the Terry floor box requires cementing the ring to the housing at a particular position, i.e., with the ring's pivotal axis position at a right angle to the direction in which the floor box is tilted. Thus, the Terry floor box is difficult to install properly.

Another example of a prior floor box which attempts to overcome the problems of the Terry floor box is shown by U.S. Pat. No. 4,331,832 to Curtis et al, which is incorporated herein by reference. The patent to Curtis et al discloses a floor box having a cover plate assembly utilizing a special ball ring to mount the cover flush with the floor. This special ball ring is cemented to the floor box for securing it thereto. Accordingly, the installer must be careful when cementing the ball ring to the housing to obtain the proper positioning of the cover.

Both floor boxes disclosed by the Terry patent and the Curtis et al patent have leveling rings cemented to the floor boxes. Thus, these prior art floor boxes can not be re-leveled once the leveling ring is cemented in place. Moreover, these prior floor box are only capable of handling one type of wires, i.e., either power wires or communication wires, not both. The National Electrical Code (N.E.C.) requires separation of power services from communication services, such as telephone or computer lines. Accordingly, communication wires must be physically separated from high voltage power wires to prevent accidental contact with the high voltage wires during installation of the communication wires. Neither the Terry patent nor the Curtis et al patent discloses separating communication wires from high voltage wires in a single floor box.

This invention addresses these problems in the art, along with other needs which will become apparent to those skilled in the art once given this disclosure.

SUMMARY OF THE INVENTION

Accordingly, a primary object of the invention is to provide an electrical outlet box assembly having a releasably coupled leveling or mounting assembly.

Another object of the invention is to provide an electrical outlet box assembly having a releasably coupled wiring enclosure for separating and insulating wires of different systems from each other within the housing.

Another object of the invention is to provide an electrical outlet box assembly having a wiring enclosure mounted therein that is adjustable in height.

Another object of the present invention is to provide an electrical outlet box assembly that is easy to manufacture and to install in a poured concrete floor.

The foregoing objects are basically attained by providing an electrical outlet box assembly for electrical wires, the combination comprising; a housing having a base, a side wall coupled to the base to form a box with an open end, and at least one aperture extending through the housing for receiving a portion of the electrical wires into the housing; and a leveling assembly coupled to the housing for coupling and leveling an electrical receptacle to the housing, the leveling assembly includes a receptacle mounting member having mounting flanges for releasably coupling the electrical receptacle thereto, and an adjusting assembly coupled between the housing and the receptacle mounting member for releasably and tiltably coupling the receptacle mounting member to the housing.

The foregoing objects are also basically attained by providing an electrical outlet box adapted to be mounted in a floor for receiving electrical wires therein, comprising: a base portion; a plastic side wall portion coupled to the base portion to form a box having an open end with the side wall portion being adapted to be cut off substantially flush with or slightly above and parallel to a floor surface; at least one aperture extending through the side wall portion for receiving a portion of the electrical wires into the box; and a plurality of coupling slots extending axially along the side wall portion with the slots being adapted to receive a coupling member for releasably coupling an electrical receptacle to the box.

Further, the foregoing objects are basically attained by providing an electrical outlet box assembly for high voltage wires and low voltage wires, the combination comprising: a housing having a base, a side wall coupled to the base to form a box with an open end, a first pair of apertures extending through the housing for receiving a portion of the high voltage wires therethrough, and a second pair of apertures extending through the housing for receiving a portion of the low voltage wires therethrough; a receptacle mounting member coupled to the housing having mounting flanges for releasably coupling an electrical receptacle thereto; and a separating and insulating assembly coupled to the housing for separating and insulating the high voltage wires from the low voltage wires in the housing to prevent contact therebetween.

Other objects, advantages and salient features of the invention will become apparent from the following detailed description, which, taken in conjunction with the annex drawings, discloses a preferred embodiment of the present invention.

BRIEF DESCRIPTION OF THE DRAWINGS

Referring now to the drawings, which form part of this original disclosure:

FIG. 9 is an enlarged, front elevational view of a retaining clip of the electrical outlet box assembly of FIGS. 1–8;

FIG. 10 is an enlarged, rear elevational view of the retaining clip shown in FIG. 9;

FIG. 11 is an elevational view in longitudinal cross section of the retaining clip taken along section line 11—11 in FIG. 10;

FIG. 12 is a side elevational view of the receptacle insulator member of the electrical outlet box assembly shown in FIG. 1;

FIG. 13 is an end elevational view of the receptacle insulator member shown in FIG. 12; and FIG. 14 is a top plan view of the receptacle mounting member of the electrical outlet box assembly shown in FIG. 1.

DETAILED DESCRIPTION OF THE INVENTION

Figure 1:
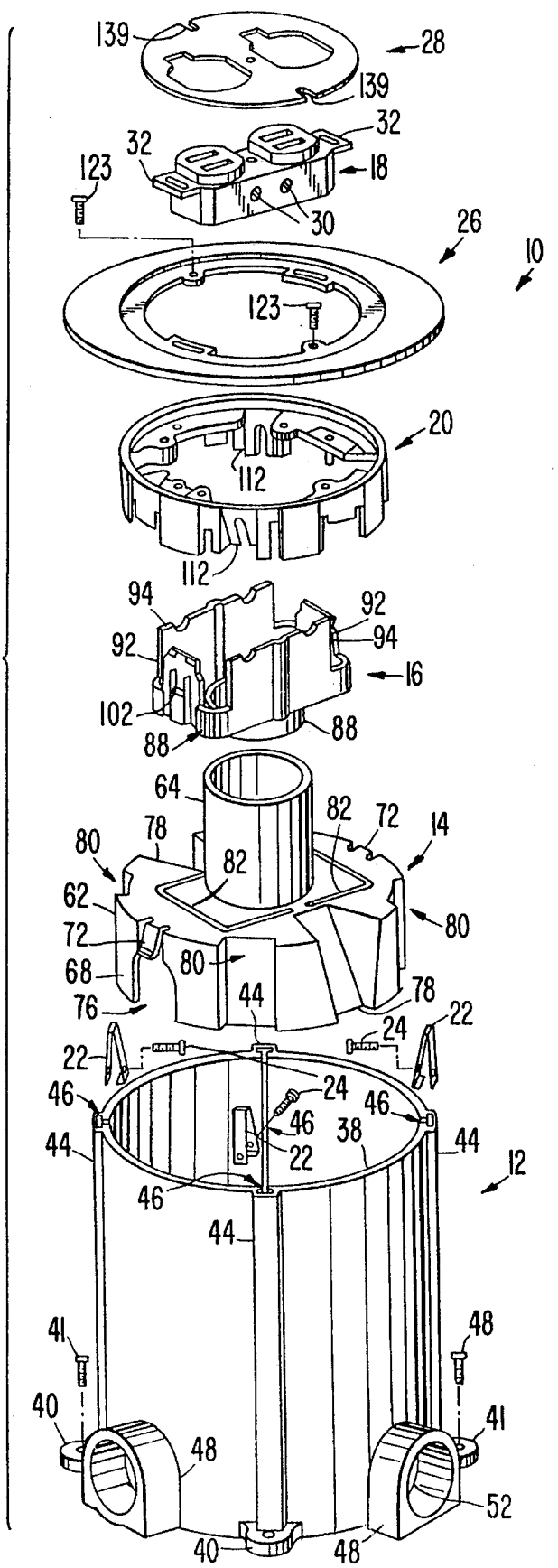
FIG. 1 is an exploded perspective view of an electrical outlet box assembly in accordance with the present invention.

Initially referring FIGS. 1–4, an electrical outlet box assembly 10 according to the present invention is illustrated, and includes a housing 12, a wiring enclosure 14 releasably coupled within housing 12 for separating and insulating power and communication wires from each other, a receptacle insulator member 16 coupled to wiring enclosure 14 for insulating an electrical receptacle 18, a receptacle mounting member or adaptor 20 for releasably mounting receptacle 18 thereto, four retaining clips 22 (only three shown) adapted to be fixedly coupled to housing 12 and releasably coupled to receptacle mounting member 20 by four leveling screws 24 (only three shown), a floor plate or carpet flange 26 releasably coupled to receptacle mounting member 20, and a receptacle cover 28 releasably coupled to electrical receptacle 18 or floor plate 26 for covering receptacle 18.

The electrical receptacle 18 and floor plate or carpet flange 26 are coupled to housing 12, via receptacle mounting member 20 and leveled relative to the surface of the tile, carpet or other suitable flooring material 27 covering a poured concrete floor or other floor structure 29 (FIG. 2) by adjusting leveling screw 24 and tilting receptacle mounting member 20 to the desired angle. Accordingly, the leveling assembly of the present invention includes receptacle mounting member 20, retaining clips 22, leveling screws 24, and coupling slots 46 in housing 12. The electrical shielding or isolating assembly for separating and insulating the power wires from the communication wires includes wiring enclosure 14 and receptacle insulation member 16.

Receptacle 18 is illustrated as a conventional duplex receptacle having a pair of terminal screws 30 on each side and a pair of mounting plates 32 at each end. It should be apparent that other types of electrical receptacles may be used with the present invention.

Figure 2:
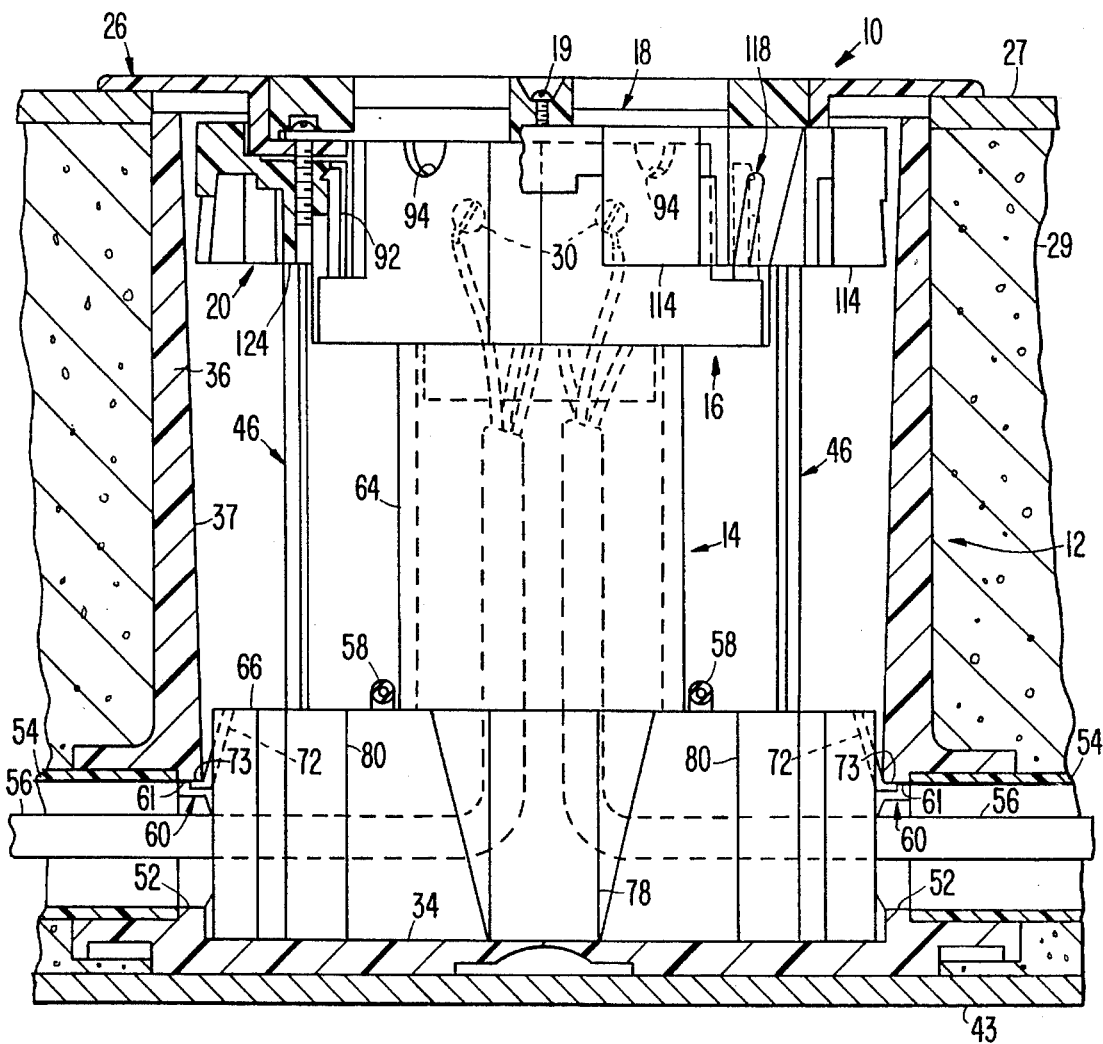
FIG. 2 is an elevational view in cross section of the electrical outlet box assembly of FIG. 1 installed in a poured concrete slab with the wiring enclosure and the receptacle insulator member both shown in elevation, and the receptacle mounting member shown in partial elevation.
Figure 7:
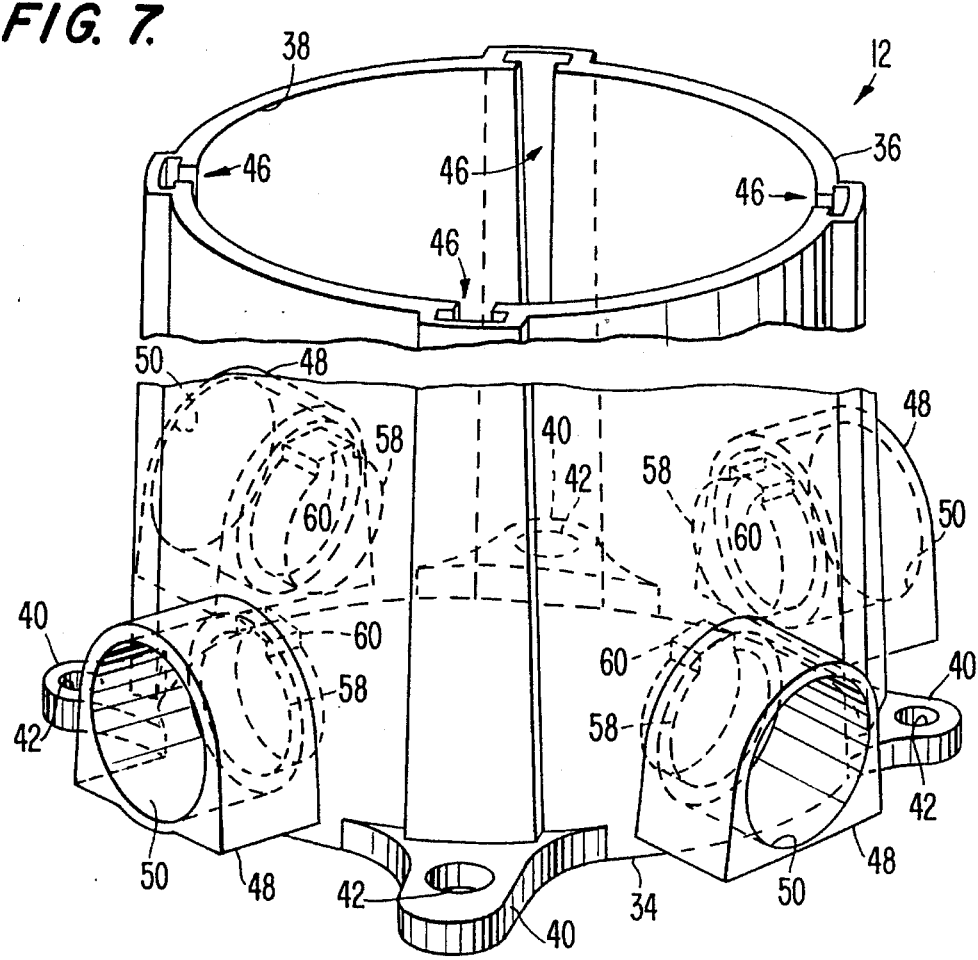
FIG. 7 is an enlarged perspective view of the housing of the electrical outlet box assembly of FIGS. 1–6.

Referring now to FIGS. 2 and 7, housing 12 is preferably a floor box having a base portion 34, a substantially cylindrical side wall portion 36 fixedly coupled to base portion 34 to form a cylindrical box with an open top end 38. Preferably, housing 12 is a one-piece, unitary, integrally molded floor box formed of any suitable substantially rigid plastic material, such as polyvinyl chloride.

Side wall portion 36 has a substantially uniform inside diameter; although, interior surface 37 of side wall portion 36 may be slightly tapered upwardly and outwardly to facilitate molding. Side wall portion 36 has four equally circumferentially spaced apart mounting flanges 40 with mounting holes 42 extending transversely therethrough for receiving mounting fasteners 41, such as screws or nails, to fixedly couple the housing or floor box 12 to a surface 43, such as a subfloor or substructure, prior to pouring the concrete floor 29 as seen in FIG. 2.

Figure 3:
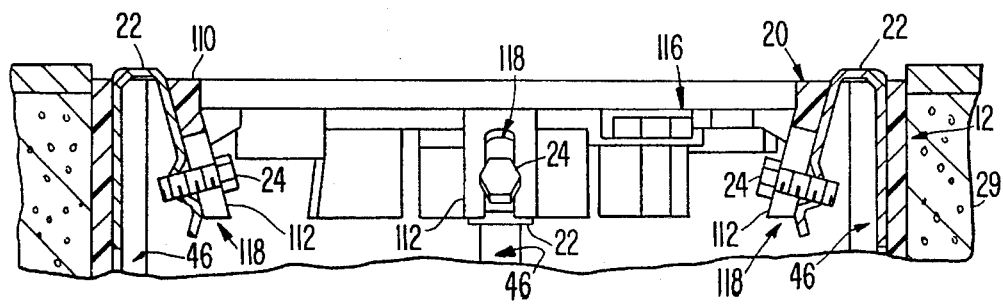
FIG. 3 is a partial elevational view in cross section of the receptacle mounting adaptor coupled to the housing in accordance with the present invention.

Four equally circumferentially spaced apart channels 44, each having a T-shaped coupling slot 46, extend axially along side wall portion 36. Each coupling slot 46 is adapted to fixedly receive a retaining clip 22 therein for adjustably coupling receptacle mounting member 20 to housing 12 as seen in FIG. 3. Preferably, coupling slots 46 extend the full length of side wall portion 36 to permit continuous and infinite height adjustment of housing 12 as discussed below.

Figure 6:
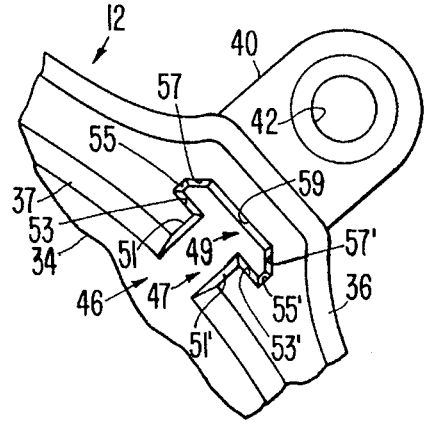
FIG. 6 is an enlarged, partial, top plan view of one of the coupling slots of the housing shown in FIGS. 1–4.

Referring now to FIG. 6, one of the coupling slots 46 is shown in detail, and includes an inner slot portion 47 and an outer slot portion 49. Inner slot portion 47 is defined by a pair opposed walls 51 and 51' to form a substantially rectangular slot connecting outer slot portion 49 with the interior of housing 12. Outer slot portion 49 is defined by a pair planar connecting walls 53 and 53' extending from opposed walls 51 and 51', respectively, a pair of opposed, radially extending side walls 55 and 55' extending from connecting walls 53 and 53', respectively, a pair of opposed tapered side walls 57 and 57' extending from radial side walls 55 and 55' respectively, and an end wall 59 extending between tapered side walls 57 and 57'. The cross sectional shape of outer slot portion 49 eliminates misalignment of retaining clip 22 received therein, since tapered side walls 57 and 57' position retaining clip 22 against connecting walls 53 and 53', while still allowing easy initial insertion of retaining clip 22 therein.

Side wall portion 36 also has four equally circumferentially spaced apart hubs or sockets 48 extending outwardly therefrom adjacent base portion 34. Each of the hubs 48 has an axially extending bore 50 which is aligned with a side wall aperture 52 which extends through side wall portion 36. Each of the bores 50 is adapted to receive an electrical conduit 54 having either high voltage power wires 56 or low voltage communication wires 58 extending therethrough. The communication wires 58 can carry data or voice transmissions. Electrical conduits 54 are preferably made of any suitable plastic material, such as polyvinyl chloride, and are secured in bores 50 by a polyvinyl chloride cement or any other suitable solvent or adhesive. Each of the side wall apertures 52 has a rectangular notch 60 for releasably coupling wiring enclosure 14 thereto, as discussed below.

Referring now to FIGS. 1, 2, 4 and 8, wiring enclosure 14 is preferably constructed of a one-piece, unitary, integrally molded plastic material, such as polyvinyl chloride. Wiring enclosure 14 separates and insulates high voltage power wires 56 from low voltage communication wires 58 to prevent contact therebetween as required by the NEC electrical code.

As particularly seen in FIGS. 2 and 4, wiring enclosure 14 is releasably coupled to housing 12 to permit power wires 56 to enter the interior of wiring enclosure 14, while communication wires 58 run over ramps 78 and the exterior surface of wiring enclosure 14 as discussed in detail below.

Figure 4:
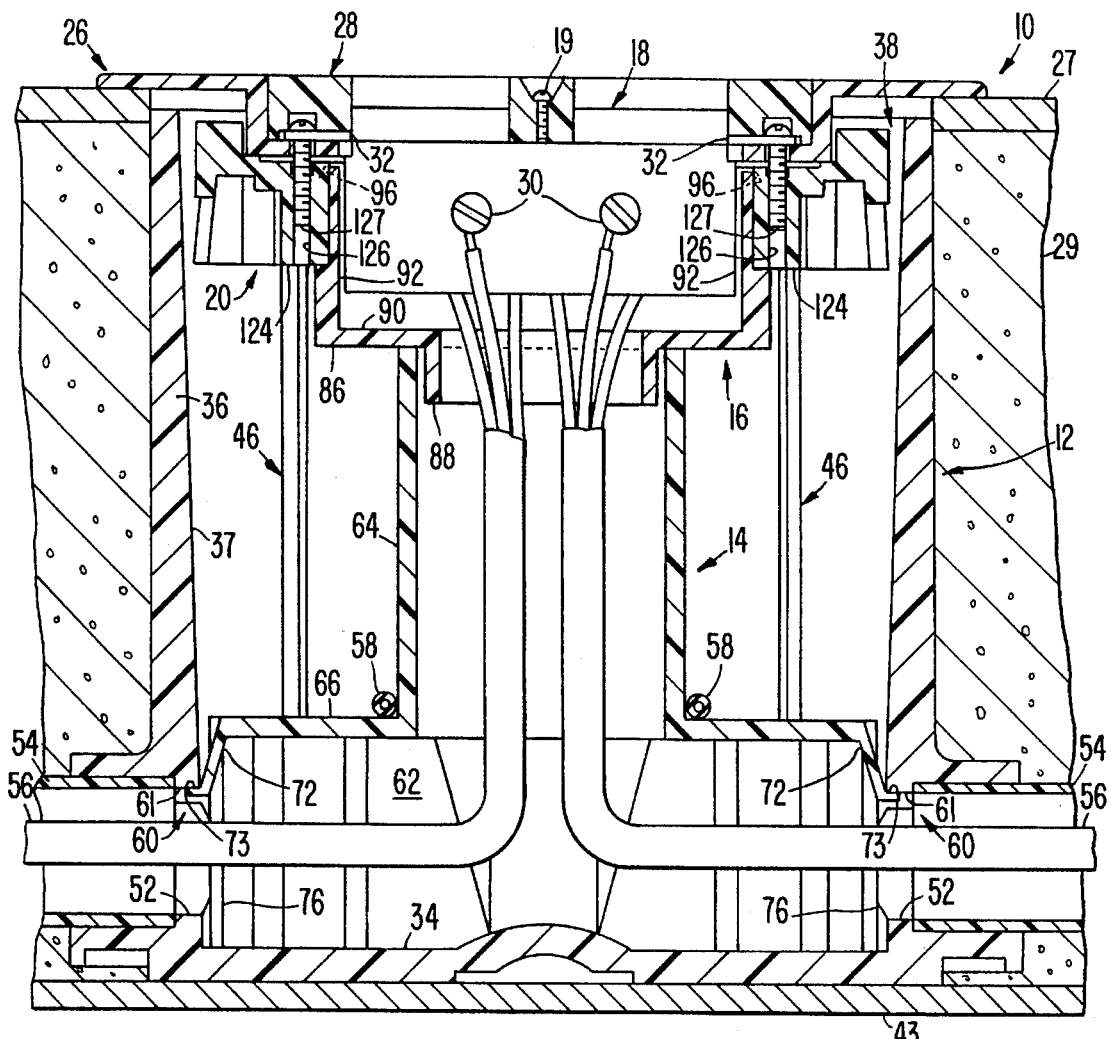
FIG. 4 is an elevational view in cross section of the electrical outlet box assembly of FIG. 1 installed in a poured concrete slab.

Accordingly, as seen in FIGS. 1, 2 and 4, wiring enclosure 14 together with receptacle insulator member 16 divides the interior of housing 12 into first and second compartments (i.e., separate wiring receiving spaces or areas), with the power wires 56 being received within the first compartment or space defined by the interior surfaces of wiring enclosure 14 and receptacle insulator member 16, and the communications wires 58 being received within the second compartment or space defined by the exterior surfaces of wiring enclosure 14 and receptacle insulator member 16. Conversely, the compartments for the power and communications wires could be reversed; the communication wires 58 would enter the wiring enclosure 14 and the power wires 56 run over the ramps 78. In any event, the power wires 56 are separated and isolated from communication wires 58 by the plastic body of the wiring enclosure 14.

Wiring enclosure 14 includes a lower substantially cylindrical base portion 62 and an upper cylindrical extension portion 64, which extends upwardly and perpendicular to a top surface 66 of lower base portion 62. Lower base portion 62 has a side wall 68 with a substantially cylindrical outer shape extending downwardly from top surface 66. The outer diameter of lower base portion 62 is preferably slightly smaller than the inside diameter of side wall portion 36.

As seen in FIGS. 1, 2, 4 and 8, cylindrical extension portion 64 is a tubular member or cylindrical tube with an interior surface and an exterior surface. Accordingly, cylindrical extension portion 64 can also be referred to as a tubular extension portion.

Wiring enclosure 14 is releasably coupled to housing 12 by two L-shaped cantilever spring members or catches 72, which are spaced 180° apart and extend outwardly from top surface 66 of lower base portion 62. Each spring member 72 has an upwardly facing surface located at its free end, which is engageable with a downwardly facing surface 61 of each of the notches 60, as seen in FIG. 2. When wiring enclosure 14 is inserted axially into housing 12, spring members 72 releasably engage two opposed notches 60 of housing 12 by a snap fit. In particular, during insertion of wiring enclosure 14 into housing 12, spring members 72 are initially biased inwardly by interior surface 37 of housing 12, until they spring outwardly into and engage a pair of opposed notches 60 of side wall apertures 52. Top surface 66 has U-shaped cutouts 74 on adjacent sides of spring members 72 to effectively lengthen spring members 72 for additional resiliency and flexibility.

Removal of wiring enclosure 14 is accomplished by wedging a tool, such a a screwdriver, between spring members 72 and interior surface 37 of housing 12, and then twisting the screwdriver until spring members 72 disengage from notches 60. Once spring members 72 are disengaged from notches 60, wiring enclosure 14 is pulled axially out of housing 12. Holding the wiring enclosure in place could be done by other means, for example a bayonet-lock mechanism snapping into place when the enclosure is rotated.

Figure 8:
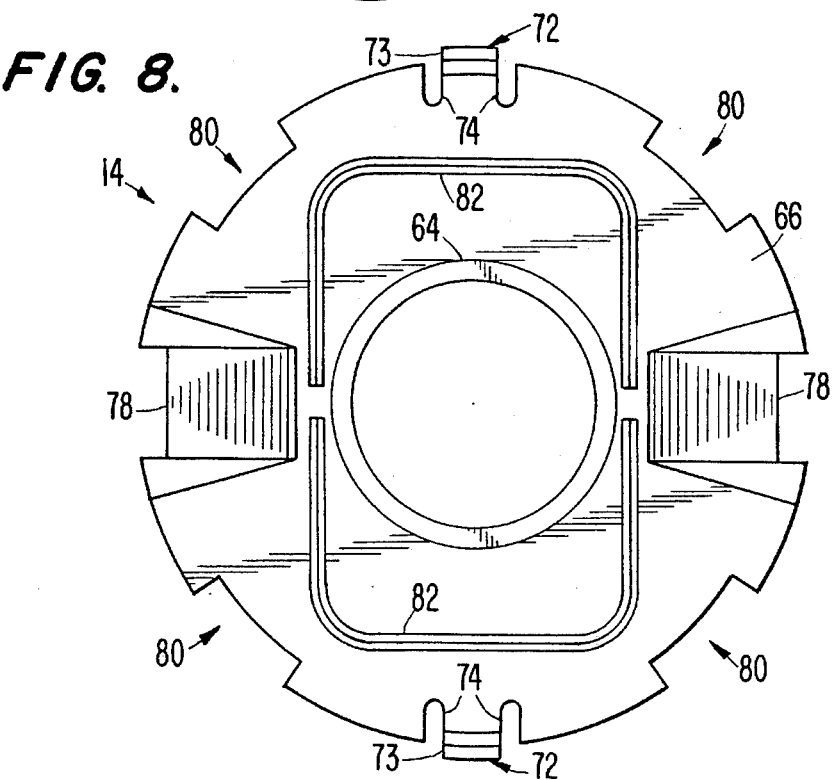
FIG. 8 is a top plan view of the wiring enclosure of the electrical outlet box assembly shown in FIGS. 1–7.

A pair of U-shaped openings 76 are formed in side wall 68 of wiring enclosure 14 directly below spring members 72 to permit power wires to enter the interior of wiring enclosure 14. Accordingly, when spring members 72 of wiring enclosure 14 are coupled in a pair of opposed notches 60, then a pair of opposed apertures 52 in housing 12 will align with U-shaped openings 76 for receiving power wires 56 into the interior of wiring enclosure 14. Openings 76 divide side wall 68 of wiring enclosure 14 into two substantially identical side wall portions as best seen in FIGS. 1 and 8. These side wall portions of side wall 68 extend downwardly from top surface 66 and have free edges which engage base portion 34 of housing 12 to close the open bottom of base portion 62 of wiring enclosure 14 as seen in FIGS. 2 and 4. Accordingly, top surface 66 and side wall 68 of base portion 62 together with base portion 34 of housing 12 form a part of the first compartment for power wires 56.

Side wall 68 also includes a pair of molded ramps 78 spaced 180° apart which are angled upwardly and inwardly for engaging and guiding communication wires 58 over the exterior surface of wiring enclosure 14. Accordingly, when wiring enclosure 14 is coupled to housing 12 via spring members 72, openings 76 are aligned with a first pair of opposed apertures 52 for receiving power wires 56 into the interior of wiring enclosure 14, while ramps 78 are aligned with a second pair of opposed apertures 52 to facilitate passing communication wires 58 into housing 12 through one aperture 52, over the exterior surface of wiring enclosure 14 and out housing 12 through another aperture 52.

Ramps 78 are preferably recessed about one-quarter inch from the periphery of side wall 68 of wiring enclosure 14 to facilitate moving wiring enclosure 14 into or out of housing 12, when communication wires 58 are extending into housing 12. Accordingly, by recessing ramps 78 a space is provided between wiring enclosure 14 and interior surface 37 of housing 12 at each of the ramps 78 to prevent pinching or crushing of the communication wires 58 between wiring enclosure 14 and housing 12 during insertion or removal of wiring enclosure 14 from housing 12.

Wiring enclosure 14 also includes four equally spaced apart notches 80 on the periphery of top surface 66 to provide clearance for retainer clips 22 during installation or removal of wiring enclosure 14 into and out of housing 12.

As seen in FIGS. 2 and 4, power wires 56 enter wiring enclosure 14 from apertures 52 of housing 12 through openings 76, and then pass upwardly through extension portion 64 to receptacle 18 contained in receptacle insulator 16.

Preferably, the height of extension portion 64 is molded to correspond to an uncut housing 12 having an overall height of approximately six inches (5¾ inches inside depth). If housing 12 is trimmed for a shallower concrete floor, then extension portion 64 is also trimmed a corresponding amount. Accordingly, both housing 12 and wiring enclosure 14 may be installed into concrete floors differing in depth.

As seen in FIG. 8, wiring enclosure 14 is also provided with two U-shaped grooves 82, which are arranged to form a generally rectangular configuration on top surface 66 of wiring enclosure 14 for providing wiring enclosure 14 with additional height adjustment. The general rectangular configuration formed by grooves 82 is sized and shaped to accept the rectangular configuration of insulator 16. Accordingly, an installer may cut along grooves 82 to remove upper extension portion 64 to form a rectangular opening, which is sized to receive receptacle insulator member 16 therein. This allows wiring enclosure 14 to be installed into concrete floors having a depth of about three to three and one-half inches.

Referring now to FIGS. 12 and 13, receptacle insulator member 16 is preferably a one-piece, unitary, integrally molded plastic member made of any suitable plastic material, such as polyvinyl chloride. Receptacle insulator member 16 includes an upper rectangular portion 86 and a lower cylindrical portion 88.

Upper portion 86 includes a bottom wall 90 fixedly coupled to lower cylindrical portion 88, two upright end walls 92 coupled to bottom wall 90 and two upright side walls 94 coupled to bottom wall 90 to form a rectangular box with an open top. Each of the end walls 92 includes a pair of protrusions 96 at its upper free end for releasably engaging and coupling receptacle insulator member 16 to receptacle mounting member 20 via a snap fit, and a positioning member 102 with a slot 104 for engaging receptacle mounting member 20 to prevent lateral movement therebetween. Side walls 94 cover terminal screws 30 of receptacle 18. Receptacle insulator member 16 also has two U-shaped notches 108 in each side wall 94. The notches 108 allow tool access to the four leveling screws 24 so that angular alignment and directional positioning are established by adjusting and tigthening the four leveling screws 24 with a tool, such as a screwdriver.

As seen in FIG. 2, lower cylindrical portion 88 fits within the upper end of extension portion 64 of wiring enclosure 14. Conversely, extension portion 64 could have a smaller diameter to fit within lower cylindrical portion 88 if desired. The overlap between lower cylindrical portion 88 and cylindrical extension portion 64 insures effective separation and insulation between power wires 56 extending through the interior of wiring enclosure 14 and receptacle insulator member 16, and communication wires 58 extending about the exterior of wiring enclosure 14.

Referring now to FIG. 14, receptacle mounting member 20 is preferably a one-piece, unitary, integrally molded member made of any suitable plastic material such as polyvinyl chloride. Receptacle mounting member 20 includes a platform ring 110, four equally circumferentially spaced apart coupling flanges 112 extending downwardly and inwardly from platform ring 110, eight equally circumferentially spaced centering tabs 114 extending downwardly from platform ring 110, a pair of mounting flanges 116 extending inwardly from platform 110 ring for releasably coupling electrical receptacle 18, and a pair of coupling flanges 117 for releasably coupling carpet flange 26 and grounding assembly 125 thereto.

As particularly seen in FIG. 3, each of the coupling flanges 112 has a vertically extending elongated slot 118, which receives a leveling screw 24 therethrough for releasably and adjustably coupling receptacle mounting member 20 to housing 12 via retaining clips 22. Accordingly, the four elongated slots 118 permit vertical and angular adjustment of receptacle mounting member 20 relative to housing 12 for leveling and mounting floor plate or carpet flange 26 thereto. The length of slots 118 determines the extent of vertical or angular adjustment of receptacle mounting, i.e., the farthest descent of receptacle mounting member 20 is reached when the upper ends of slots 118 contact level screws 24.

Preferably, coupling flanges 112 are inclined downwardly and inwardly about 15° towards the center of the receptacle mounting member 20 to afford convenient access for tigthening leveling screws 24 with a screw driver. Slots 118 are also spaced 90° apart to allow rotational adjustment of electrical receptacle 18.

As seen in FIG. 14, centering tabs 114 are spaced about the periphery of platform ring 110 to assist in centering receptacle mounting member 20 in housing 12. Also, centering tabs 114 can serve as a glue or cement tab, if it is desired to permanently secure receptacle mounting member 20 to housing 12.

Mounting flanges 116 are spaced 180° apart and each includes an upper portion 120 and a lower recessed portion 122 having a mounting screw boss 124 with a self-tapping bore 126 for receiving a threaded fastener 127 to releasably couple receptacle 18 thereto as seen in FIGS. 2, 4 and 14. Preferably, bore 126 has longitudinally molded protrusions or flutes on its inner surface for threadedly receiving threaded fastener 127. Recessed portions 122 are adapted to receive mounting plates 32 of receptacle 18 as seen in FIGS. 2 and 4.

Figure 5:
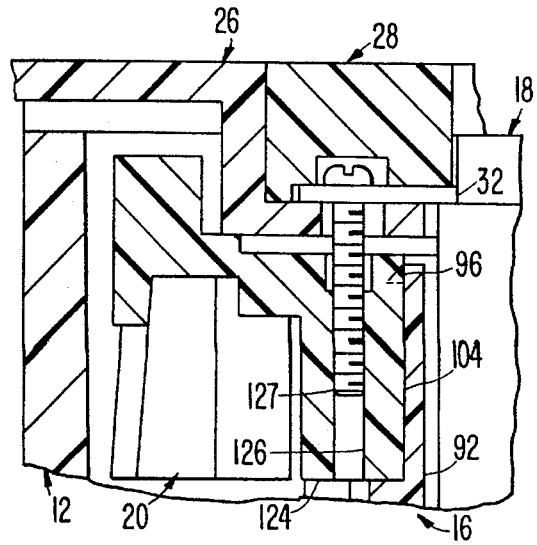
FIG. 5 is an enlarged, partial, elevational view in cross section of the receptacle mounting adaptor and receptacle insulator member coupled together in the housing in accordance with the present invention.

Each of the recessed portions 122 also has a ledge 128, which engages protrusions 96 on end walls 92 of receptacle insulator member 16 via a snap-fit for releasably coupling receptacle insulator member 16 to receptacle mounting member 20 as seen in FIG. 5. When receptacle mounting member 20 and receptacle insulator member 16 are coupled together, mounting screw bosses 124 are received in slots 104 in end walls 92 of receptacle insulator member 16 to prevent lateral movement therebetween.

As seen in FIG. 14, receptacle mounting member 20 may also include a grounding assembly 125, which is mounted to platform ring 110 in a conventional manner. Since grounding assembly 125 is conventional, it will not be discussed in detail herein.

As seen in FIGS. 9–11, each of the retaining clips 22 includes a planar tongue portion 130, a mounting portion 132 connected to tongue portion 130 by a connecting portion 134. Tongue portion 130 of each of the retaining clips 22 includes four barbs 136, which dig into the plastic walls of coupling slots 46 for fixedly coupling retaining clips 22 therein. The mounting portion 132 of each retaining clip 22 has a single threaded bore 138 for threadedly receiving a leveling screw 24 therein. Retaining clips 22 are preferably made of steel, plated for corrosion protection.

Floor plate or carpet flange 26 and receptacle cover 28 are both conventional within the electrical floor box art, and thus are not discussed in detail herein. Floor plate or carpet flange 26 is releasably coupled to receptacle mounting member 20 by the threaded fasteners 123 which are threadedly received in threaded bores 121 in receptacle mounting member 20. Likewise, receptacle cover 28 is releasably coupled to electrical receptacle 18 by threaded fastener 19. Also receptacle cover 28 may be releasably coupled to carpet flange 26.

Installation

As a preferred installation procedure, housing 12 is first fixedly coupled, by screws 41, to surface 43, i.e., earth when installed on grade or a sub-flooring material as shown in FIG. 2. Conduits 54 are now fixedly coupled in hubs or sockets 48 of housing 12 by cement or other suitable connection. If a hub or socket 48 is not being used, then the hub or socket 48 which is not coupled to a conduit 54 must be plugged to prevent concrete from entering housing 12. Also, the open top end 38 of housing 12 should be covered with a lid to keep concrete out of housing 12. Now, the concrete floor is poured and leveled to the desired depth. At this stage, the upper end of housing 12 should be protruding up above the concrete surface.

As soon as the concrete has hardened, the portion of housing 12 extending above the concrete surface is cut off nearly flush with the surface of concrete. Likewise, cylindrical extension portion 64 of wiring enclosure 14 is also cut to the corresponding height for the poured concrete floor. Retaining clips 22 are now hammered into coupling slots 46 of housing 12 to fixedly couple retaining clips 22 to housing 12 via barbs 136 digging into the plastic walls of coupling slots 46.

Next wiring enclosure 14 is inserted into housing 12 and coupled thereto via a snap fit as discussed above. Power wires 56 and communication wires 58 are now pulled or pushed into housing 12 through conduits 54. Power wires 56 enter housing 12 through a first pair of opposed apertures 52, and then pass through openings 76 into the interior of wiring enclosure 14, where they extend upwardly through extension portion 64. Communication wires 58 enter housing 12 through the second pair of opposed apertures 52 where they contact ramps 78, which guides communication wires 58 over wiring enclosure 14 where communication connectors may be installed as necessary. Also communication wires 58 may exit through openings 139 in receptacle cover 28 as necessary.

Insulator member 16 is now coupled to receptacle mounting member 20 via a snap fit as discussed above.

Receptacle mounting member 20 with insulator member 16 coupled thereto is then coupled to housing 12 by first threading leveling screws 24 into bores 138 of retaining clips 22, and then inserting receptacle mounting member 20 into housing 12 with slots 118 straddling leveling screws 24 and lower cylindrical portion 88 being inserted into extension portion 64. Carpet flange 26 is now coupled to receptacle mounting member 20 by threaded fasteners 123 for establishing the height and levelness of receptacle mounting member 20 relative to the finished floor 27. Once receptacle mounting member 20 is in its leveled position leveling screws 24 are tightened to retain it in place.

Electrical receptacle 18 is electrically coupled to power wires 56 and coupled to receptacle mounting member 20 via threaded fasteners 127.

Finally, receptacle cover 28 is coupled to receptacle 18 by threaded fastener 19 to complete the installation.

While only one embodiment has been chosen to illustrate the invention, it will be understood by those skilled in the art that various changes and modifications can be made herein without departing from the scope of the invention as defined in the appended claims.

What is claimed is:

1. An electrical outlet box assembly for electrical wires, the combination comprising:

a housing having a base, a side wall coupled to said base to form a box with an open end, and at least one aperture extending through said housing for receiving a portion of the electrical wires into said housing; and leveling means, coupled to said housing, for coupling an electrical receptacle to said housing, said leveling means including a receptacle mounting member having mounting means for releasably coupling the electrical receptacle thereto, and adjusting means, coupled between said housing and said receptacle mounting member, for releasably and tiltably coupling said receptacle mounting member to said housing, said adjusting means including a plurality of retaining clips adjustably coupled along said side wall of said housing.

2. An electrical outlet box assembly according to claim 1, wherein said housing is formed of a substantially rigid plastic material.

3. An electrical outlet box assembly according to claim 2, wherein said side wall is substantially cylindrical with a substantially uniform inside diameter.

4. An electrical outlet box assembly according to claim 1, wherein said housing has a plurality of said apertures for receiving portions of the electrical wires therethrough, the electrical wires including both power wires and communication wires.

5. An electrical outlet box assembly for electrical wires, the combination comprising:

a housing having a base, a side wall coupled to said base to form a box with an open end, at least one aperture extending through said housing for receiving a portion of the electrical wires into said housing, and a plurality of coupling slots extending longitudinally between said base and said open end of said housing; and leveling means, coupled to said housing, for coupling an electrical receptacle to said housing, said leveling means including a receptacle mounting member having mounting means for releasably coupling the electrical receptacle thereto, and adjusting means, coupled between said housing and said receptacle mounting member, for releasably and tiltably coupling said receptacle mounting member to said housing.

6. An electrical outlet box assembly according to claim 5, wherein said adjusting means further includes a plurality of retaining clips, one of said clips slidably received in each of said coupling slots.

7. An electrical outlet box assembly according to claim 6, wherein said coupling slots are integrally molded with said side wall of said housing and said retaining clips are fixedly coupled within said coupling slots.

8. An electrical outlet box assembly according to claim 7, wherein said adjusting means further includes a screw threadedly received in an opening formed in each of said retaining clips.

9. An electrical outlet box assembly according to claim 8, wherein each of said coupling slots has a substantially T-shaped cross-section with an inner slot portion and an outer slot portion, said outer slot portion has a pair of opposed side walls with each of said side walls having a substantially radially extending portion and a tapering portion.

10. An electrical outlet box assembly according to claim 8, wherein said adjusting means includes four of said retaining clips and four of said screws.

11. An electrical outlet box assembly according to claim 8, wherein said receptacle mounting member includes a plurality of coupling flanges with an elongated slot in each of said coupling flanges for receiving one of said screws.

12. An electrical outlet box assembly according to claim 11, wherein said coupling flanges are angled 15° downwardly and inwardly.

13. An electrical outlet box assembly for electrical wires, the combination comprising:

a housing having a base, a side wall coupled to said base to form a box with an open end, and at least one aperture extending through said housing for receiving a portion of the electrical wires into said housing, said housing having a plurality of said apertures for receiving portions of the electrical wires therethrough, the electrical wires including both power wires and communication wires;

leveling means, coupled to said housing, for coupling an electrical receptacle to said housing, said leveling means including a receptacle mounting member having mounting means for releasably coupling the electrical receptacle thereto, and adjusting means, coupled between said housing and said receptacle mounting member, for releasably and tiltably coupling said receptacle mounting member to said housing; and a wiring enclosure having an interior passage and an exterior surface, said wiring enclosure being removably coupled within said housing for separating and insulating the power wires from the communication wires entering said housing through said apertures.

14. An electrical outlet box assembly according to claim 13, wherein said wiring enclosure includes a pair of catches releasably received in a pair of notches formed in said housing for releasably coupling said wiring enclosure to said housing.

15. An electrical outlet box assembly according to claim 14, wherein said wiring enclosure further includes a base portion with a pair of openings which are aligned with a first pair of said apertures when coupled to said housing for passing the power wires into said interior passage of said wiring enclosure, and a tubular portion extending from said base portion.

16. An electrical outlet box assembly according to claim 15, wherein said base portion also includes a pair of inclined ramps which are aligned with a second pair of said apertures when coupled to said housing for guiding the communication wires over said exterior surface of said wiring enclosure.

17. An electrical outlet box adapted to be mounted in a floor for receiving electrical wires therein, comprising:

a base portion;

a plastic side wall portion coupled to said base portion to form a box having an open end with said side wall portion being adapted to be cut off substantially flush with or slightly above and parallel to the top of the floor;

at least one aperture extending through said side wall portion for receiving a portion of the electrical wires into said box; and a plurality of coupling slots extending axially along said side wall portion with said slots being adapted to receive a coupling member for releasably coupling an electrical receptacle to said box, said coupling slots expending substantially the entire length of said side wall portion.

18. An electrical outlet box adapted to be mounted in a floor for receiving electrical wires therein, comprising:

a base portion;

a plastic side wall portion coupled to said base portion to form a box having an open end with said side wall portion being adapted to be cut off substantially flush with or slightly above and parallel to the top of the floor, said side wall portion being substantially cylindrical with a substantially uniform inside diameter;

at least one aperture extending through said side wall portion for receiving a portion of the electrical wires into said box; and a plurality of coupling slots extending axially along said side wall portion with said slots being adapted to receive a coupling member for releasably coupling an electrical receptacle to said box.

19. An electrical outlet box adapted to be mounted in a floor for receiving electrical wires therein, comprising:

a base portion;

a plastic side wall portion coupled to said base portion to form a box having an open end with said side wall portion being adapted to be cut off substantially flush with or slightly above and parallel to the top of the floor, said side wall portion having four apertures extending through said side wall portion for receiving a portion of the electrical wires into said box and four hubs with one of said hubs extending outwardly from each of said apertures for receiving an electrical conduit therein; and a plurality of coupling slots extending axially along said side wall portion with said slots being adapted to receive a coupling member for releasably coupling an electrical receptacle to said box.

20. An electrical outlet box according to claim 19, wherein said hubs are spaced 90° apart from one another.

21. An electrical outlet box assembly for high voltage and low voltage wires, the combination comprising:

a housing having a base, a side wall coupled to said base to form a box with an open end, a first pair of apertures extending through said housing for receiving a portion of the high voltage wires therethrough, and a second pair of apertures extending through said housing for receiving a portion of the low voltage wires therethrough;

a receptacle mounting member coupled to said housing having mounting means for releasably coupling an electrical receptacle thereto; and means, coupled to said housing, for separating and insulating the high voltage wires from the low voltage wires in said housing to prevent contact therebetween, said means for separating and insulating including a wiring enclosure having an interior passage for receiving the high voltage wires and an exterior surface for engaging and separating the low voltage wires from the high voltage wires.

22. An electrical outlet box according to claim 21, wherein said means for separating and insulating is releasably coupled to said housing.

23. An electrical outlet box assembly according to claim 21, wherein said wiring enclosure includes a pair of catches releasably received in a pair of notches formed in said housing.

24. An electrical outlet box assembly according to claim 23, wherein said wiring enclosure further includes a base portion having a pair of openings aligned with said first pair of apertures when coupled to said housing for passing the high voltage wires into said interior passage of said wiring enclosure.

25. An, electrical outlet box assembly according to claim 24, wherein said base portion of said wiring enclosure further includes a pair of inclined ramps aligned with said second pair of apertures when coupled to said housing for guiding the low voltage wires over said exterior surface of said wire enclosure.

26. An electrical outlet box assembly according to claim 24, wherein said wiring enclosure further includes a base portion and a tubular extension portion with a portion of said tubular extension portion adapted to be cut off for adjusting the height of said wiring enclosure.

27. An electrical outlet box assembly according to claim 26, wherein said means for separating and insulating includes a receptacle insulator member adapted to surround the electrical receptacle coupled to said receptacle mounting member.

28. An electrical outlet box assembly according to claim 27, wherein said receptacle insulator member includes an upper portion releasably coupled to said receptacle mounting member, and a lower cylindrical portion adapted to be coupled to said tubular extension portion of said wiring enclosure to separate the high voltage wires passing through said interior passage of said wiring enclosure to said upper portion of said receptacle insulator member from the low voltage wires.

29. An electrical outlet box assembly according to claim 26, wherein said wiring enclosure is formed of a substantially rigid plastic material.

30. An electrical outlet box assembly according to claim 19, wherein said housing is formed of a substantially rigid plastic material.

31. An electrical outlet box assembly for high voltage and low voltage wires, the combination comprising:

a housing with an open end, a first aperture extending through said housing for receiving a portion of the high voltage wires therethrough, and a second aperture extending through said housing for receiving a portion of the low voltage wires therethrough;

a receptacle mounting member coupled to said housing having mounting means for coupling an electrical receptacle thereto;

isolating means for separating and insulating the high voltage wires from the low voltage wires in said housing to prevent contact therebetween;

coupling means, coupled to said isolating means and said housing, for releasably coupling said isolating means in said housing, said coupling means including a first surface located on said isolating means and facing in a first direction, a second surface located on said housing and facing in a second direction opposite said first direction and engagable with said first surface, and means for resiliently coupling one of said first and second surfaces to permit relative transverse biasing of said first and second surfaces during coupling and uncoupling of said isolating means in said housing.

32. An electrical outlet box assembly according to claim 31, wherein said first surface is resiliently coupled to said isolating means, and said second surface is part of a notch formed in said housing.

33. An electrical outlet box assembly according to claim 31, wherein said coupling means includes an outwardly extending catch resiliently coupled to said isolating means with said first surface located on said catch.

34. An electrical outlet box assembly according to claim 31, wherein said coupling means includes a pair of outwardly extending catches resiliently coupled to said isolating means with a portion of said first surface being located on each of said catches, and a first pair of notches formed in said housing with a portion of said second surface being located in each of said notches.

35. An electrical outlet box assembly according to claim 34, wherein said catches are spaced 180° apart on said isolating means.

36. The electrical outlet box assembly according to claim 35, wherein said coupling means includes a second pair of notches formed in said housing with each of said notches of said first and second pair of notches being spaced 90° apart from each adjacent notch.

37. The electrical outlet box assembly according to claim 36, wherein said housing includes a pair of said first apertures and a pair of said second apertures with one of said notches of said first pair of notches being positioned adjacent each of said first apertures and one of said notches of said second pair of notches being positioned adjacent each of said second apertures.

38. An electrical outlet box assembly according to claim 37, wherein said isolating means further includes a wiring enclosure having a base portion with an exterior surface, an interior passage, and a pair of openings aligned with said first pair of apertures when coupled to said housing for passing the high voltage wires into said interior passage of said wiring enclosure.

39. An electrical outlet box assembly according to claim 38, wherein said base portion of said wiring enclosure further includes a pair of inclined ramps aligned with said second pair of apertures when coupled to said housing for guiding the low voltage wires over said exterior surface of said wire enclosure.

40. An electrical outlet box assembly according to claim 39, wherein said wiring enclosure further includes a tubular extension portion with a portion of said tubular extension portion adapted to be cut off for adjusting the height of said wiring enclosure.

41. An electrical outlet box assembly according to claim 40, wherein said isolating means further includes a receptacle insulator member adapted to surround the electrical receptacle coupled to said receptacle mounting member.

42. An electrical outlet box assembly according to claim 41, wherein said receptacle insulator member includes an upper portion releasably coupled to said receptacle mounting member, and a lower cylindrical portion adapted to be coupled to said tubular extension portion of said wiring enclosure to separate the high voltage wires passing through said interior passage of said wiring enclosure to said upper portion of said receptacle insulator member from the low voltage wires.

43. An electrical outlet box assembly according to claim 41, wherein said wiring enclosure and said receptacle insulator member are formed of a substantially rigid plastic material.

44. An electrical outlet box assembly according to claim 31, wherein said housing is formed of a substantially rigid plastic material.

45. An electrical outlet box assembly for high voltage and low voltage wires, the combination comprising:

a housing with an open end, a first aperture extending through said housing for receiving a portion of the high voltage wires therethrough, and a second aperture extending through said housing for receiving a portion of the low voltage wires therethrough;

leveling means, coupled to said housing, for coupling an electrical receptacle to said housing, said leveling means including a receptacle mounting member coupled to said housing having mounting means for releasably coupling the electrical receptacle thereto, and adjusting means, coupled between said housing and said receptacle mounting member, for releasably and tiltably coupling said receptacle mounting member to said housing;

isolating means for separating the high voltage wires from the low voltage wires in said housing to prevent contact therebetween;

coupling means, coupled to said isolating means and said housing, for releasably coupling said isolating means in said housing, said coupling means including a first surface located on said isolating means and facing in a first direction, a second surface located on said housing and facing in a second direction opposite said first direction and engagable with said first surface, and means for resiliently coupling one of said first and second surfaces to permit relative transverse biasing of said first and second surfaces during coupling and uncoupling of said isolating means in said housing.

46. An electrical outlet box assembly according to claim 45, wherein said first surface is resiliently coupled to said isolating means, and said second surface is part of a notch formed in said housing.

47. An electrical outlet box assembly according to claim 45, wherein said coupling means includes a pair of outwardly extending catches resiliently coupled to said isolating means with a portion of said first surface being located on each of said catches, and a first pair of notches formed in said housing with a portion of said second surface being located in each of said notches.

48. An electrical outlet box assembly according to claim 47, wherein said catches are spaced 180° apart on said isolating means.

49. An electrical outlet box assembly according to claim 48, wherein said coupling means includes a second pair of notches formed in said housing with each of said notches of said first and second pair of notches being spaced 90° apart from each adjacent notch.

50. An electrical outlet box assembly according to claim 49, wherein said housing includes a pair of said first apertures and a pair of said second apertures with one of said notches of said first pair of notches being positioned adjacent each of said first apertures and one of said notches of said second pair of notches being positioned adjacent each of said second apertures.

51. An electrical outlet box assembly according to claim 50, wherein said isolating means further includes a wiring enclosure having a base portion with an exterior surface, an interior passage, and a pair of openings aligned with said first pair of apertures when coupled to said housing for passing the high voltage wires into said interior passage of said wiring enclosure.

52. An electrical outlet box assembly for high voltage and low voltage wires, the combination comprising:

a housing having a base, a side wall coupled to said base to form a box with an open end, a first pair of apertures extending through said housing for receiving a portion of the high voltage wires therethrough, and a second pair of apertures extending through said housing for receiving a portion of the low voltage wired therethrough;

a receptacle mounting member coupled to said housing having mounting means for releasably coupling an electrical receptacle thereto; and means, coupled to said housing, for separating the high voltage wires from the low voltage wires in said housing to prevent contact therebetween, said means for separating including a wiring enclosure releasably coupled to said housing and having an interior passage extending between said first pair of apertures and adjacent said receptacle mounting member for receiving the high voltage wires therein and an exterior surface for separating the low voltage wires from the high voltage wires.

53. An electrical outlet box assembly according to claim 54, wherein said wiring enclosure includes a pair of catches releasably received in a pair of notches formed in said housing.

54. An electrical outlet box assembly according to claim 53, wherein said wiring enclosure further includes a base portion having a pair of openings aligned with said first pair of apertures when coupled to said housing for passing the high voltage wires into said interior passage of said wiring enclosure.

55. An electrical outlet box assembly according to claim 52, wherein said wiring enclosure further includes a base portion and a tubular extension portion with a portion of said tubular extension portion adapted to be cut off for adjusting the height of said wiring enclosure.

56. An electrical outlet box assembly according to claim 52, wherein said means for separating includes a receptacle insulator member adapted to surround the electrical receptacle coupled to said receptacle mounting member.

57. An electrical outlet box assembly, comprising:

a housing having a base, a tubular side wall coupled to said base to form a box with an open end, a first aperture extending through said housing for receiving a portion of a first wire therethrough, and a second aperture extending through said housing for receiving a portion of a second wire therethrough;

a wiring enclosure removably positioned within said housing for dividing said housing into first and second compartments to separate the first wire from the second wire within said housing, said wiring enclosure having an interior surface defining said first compartment of said housing for receiving a portion of the first wire therethrough and an exterior surface defining said second compartment of said housing for receiving a portion of the second wire therein; and a receptacle mounting member coupled to said wiring enclosure, said receptacle insulator member having side walls and bottom wall to form a box with an open top for receiving a portion of an electrical wiring device therein and an opening in said bottom wall for communicating with said wiring enclosure to receive a portion of the first wire therein, said receptacle insulator member being shaped to at least partially surround the electrical wiring device being mounted within the electrical box.

58. An electrical outlet box assembly according to claim 57, wherein:

said housing includes a third aperture extending through said housing and a fourth aperture extending through said housing, said third aperture being positioned to communicate with said first compartment formed by said wiring enclosure and said fourth aperture being positioned to communicate with said second compartment formed by said wiring enclosure.

59. An electrical outlet box assembly, comprising:

a housing having a base, a side wall coupled to said base to form a box with an open end, a first aperture extending through said housing for receiving a portion of a first wire therethrough, and a second aperture extending through said housing for receiving a portion of a second wire therethrough; and a wiring enclosure removably positioned within said housing for dividing said housing into first and second compartments to separate the first wire from the second wire within said housing, said wiring enclosure having an interior surface defining said first compartment of said housing for receiving a portion of the first wire therethrough and an exterior surface defining said second compartment of said housing for receiving a portion of the second wire therein, said wiring enclosure including a base portion defining a first portion of said first compartment of said housing, and a tubular extension portion extending substantially perpendicular to said base portion for defining a second portion of said first compartment of said housing.

60. An electrical outlet box assembly according to claim 59, wherein said housing having at least one notch for engaging a portion of said wiring enclosure to couple said wiring enclosure to said housing when said wiring enclosure is operatively positioned within said housing.

61. An electrical outlet box assembly, comprising:

a housing having a base, a side wall coupled to said base to form a box with an open end, a first aperture extending through said housing for receiving a portion of a first wire therethrough, and a second aperture extending through said housing for receiving a portion of a second wire therethrough; and a wiring enclosure positioned within said housing for dividing said housing into first and second compartments to separate the first wire from the second wire within said housing, said wiring enclosure having an interior surface defining said first compartment of said housing for receiving a portion of the first wire therethrough and an exterior surface defining said second compartment of said housing for receiving a portion of the second wire therein, said housing including a third aperture extending through said housing and a fourth aperture extending through said housing, said third aperture being positioned to communicate with said first compartment formed by said wiring enclosure and said fourth aperture being positioned to communicate with said second compartment formed by said wiring enclosure, said wiring enclosure including a base portion defining a first portion of said first compartment of said housing, and a tubular extension portion extending substantially perpendicular to said base portion for defining a second portion of said first compartment of said housing.

62. An electrical outlet box assembly according to claim 61, wherein said wiring enclosure has a receptacle insulator member coupled thereto for receiving and surrounding an electrical wiring device, and said receptacle insulator member being coupled to said tubular portion of said wiring enclosure for receiving a portion of the first wire therein.

63. A wiring enclosure for dividing a cylindrical electrical box into a first compartment and a second compartment, comprising:

a base portion sized to be received in the cylindrical electrical box, and having a top surface, an open bottom and a side wall with a pair of side wall portions extending downwardly from said top surface, said top surface together with said side wall portions form a wire receiving space, said side wall portions being separated by a pair of openings adapted to align with a pair of apertures in the electrical box for receiving wires within said space formed by said top surface and said side wall portions, each of said side wall portions has a free edge for engaging the electrical box to close said open bottom of said base portion so that said space forms a part of the first compartment of the electrical box; and a tubular extension portion integrally formed with said top surface of said base portion as a one-piece, unitary member from a rigid plastic material and extending substantially perpendicular from said top surface of said base portion, said tubular extension portion having its interior in communication with said space formed between said top surface and said side wall portions of said base portion to form a part of the first compartment of the electrical box.

64. A wiring enclosure for an electrical box, comprising:

a base portion with a pair of side wall portions forming a pair of openings adapted to align with a pair of apertures in the electrical box; and a tubular extension portion coupled to said base portion and extending substantially perpendicular from said base portion, and further comprising in combination therewith a receptacle insulator member coupled to said tubular extension portion, and having an opening formed therein for communicating with said tubular extension portion, said receptacle insulator member being shaped to at least partially surround an electrical wiring device mounted within the electrical box.

65. A wiring enclosure according to claim 64, wherein said tubular extension portion is a substantially cylindrical tube.

66. A wiring enclosure according to claim 64, wherein said side wall portions of said base portion are substantially identical.

67. A wiring enclosure according to claim 66, wherein said base portion further includes a top surface extending between said side wall portions, and said tubular extension portion is rigidly coupled to said top surface.

68. A wiring enclosure according to claim 67, wherein said base portion and tubular extension are formed of a unitary, one-piece, rigid plastic material.

69. An electrical floor box assembly, comprising:

a housing having a base, a mounting hole for coupling said housing to a mounting surface, a side wall coupled to said base to form a box with an open end, a first aperture extending through said side wall of said housing for receiving a portion of a first wire therethrough, a second aperture extending through said side wall of said housing for receiving a portion of a second wire therethrough, a third aperture extending through said side wall of said housing for receiving a portion of a third wire therethrough, and a fourth aperture extending through said side wall of said housing for receiving a portion of a fourth wire therethrough, said first and third apertures being positioned between said second and fourth apertures, and said first aperture being positioned opposite said third aperture;

a wiring enclosure removably positioned within said housing for dividing said housing to define a first compartment within said housing between said first and third apertures and to separate the portions of the first and third wires within said housing from the portions of the second and fourth wires within said housing, said wiring enclosure including a base portion and a tubular extension portion, said base portion having a top surface with said tubular extension coupled thereto and a pair of side wall portions extending downwardly from said top surface with a pair of openings being formed in said base portion which align with said first and third apertures; and a receptacle insulator member coupled to said tubular extension portion of said wiring enclosure, said receptacle insulator member having side walls and a bottom wall to form a box with an open top for receiving a portion of an electrical wiring device therein and an opening in said bottom wall for communicating with said wiring enclosure to receive a portion of the first wire therein, said receptacle insulator member being shaped to at least partially surround the electrical wiring device being mounted within said electrical box.

\* \* \* \* \*